United States Patent
Lam et al.

(10) Patent No.: US 10,678,116 B1
(45) Date of Patent: Jun. 9, 2020

(54) ACTIVE MULTI-COLOR PBP ELEMENTS

(71) Applicant: Oculus VR, LLC, Menlo Park, CA (US)

(72) Inventors: Wai Sze Tiffany Lam, Redmond, WA (US); Lu Lu, Kirkland, WA (US); Scott Charles McEldowney, Redmond, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 15/990,393

(22) Filed: May 25, 2018

Related U.S. Application Data

(60) Provisional application No. 62/583,666, filed on Nov. 9, 2017.

(51) Int. Cl.
| | | |
|---|---|---|
| *G02F 1/29* | (2006.01) | |
| *G02F 1/139* | (2006.01) | |
| *G02B 27/01* | (2006.01) | |
| *G06F 3/01* | (2006.01) | |

(52) U.S. Cl.
CPC ............. *G02F 1/29* (2013.01); *G02F 1/1393* (2013.01); *G02B 2027/0178* (2013.01); *G02F 2001/294* (2013.01); *G02F 2203/05* (2013.01); *G02F 2203/07* (2013.01); *G06F 3/013* (2013.01)

(58) Field of Classification Search
CPC ...... G02F 1/29; G02F 1/1393; G02F 2203/05; G02F 2203/07; G02F 2001/294; G06F 3/013; G02B 2027/0178
See application file for complete search history.

(56) References Cited

U.S. PATENT DOCUMENTS

2018/0239177 A1* 8/2018 Oh ..................... G02F 1/137

* cited by examiner

*Primary Examiner* — Phu Vu
(74) *Attorney, Agent, or Firm* — Matthew A. Pequignot; Evan J. Newman

(57) ABSTRACT

An active PBP device having a reduced chromatic and angular dependence of focusing power includes a stack of active PBP devices where each PBP LC element of the stack has a birefringence of odd number of half wavelengths at one of the R, G, B color channels, and even number of half wavelengths at remaining ones of the R, G, B color channels. Retarder sheets are used to improve off-axis operation of the active PBP device. The device can be placed near user's eye in a head mounted display.

20 Claims, 14 Drawing Sheets

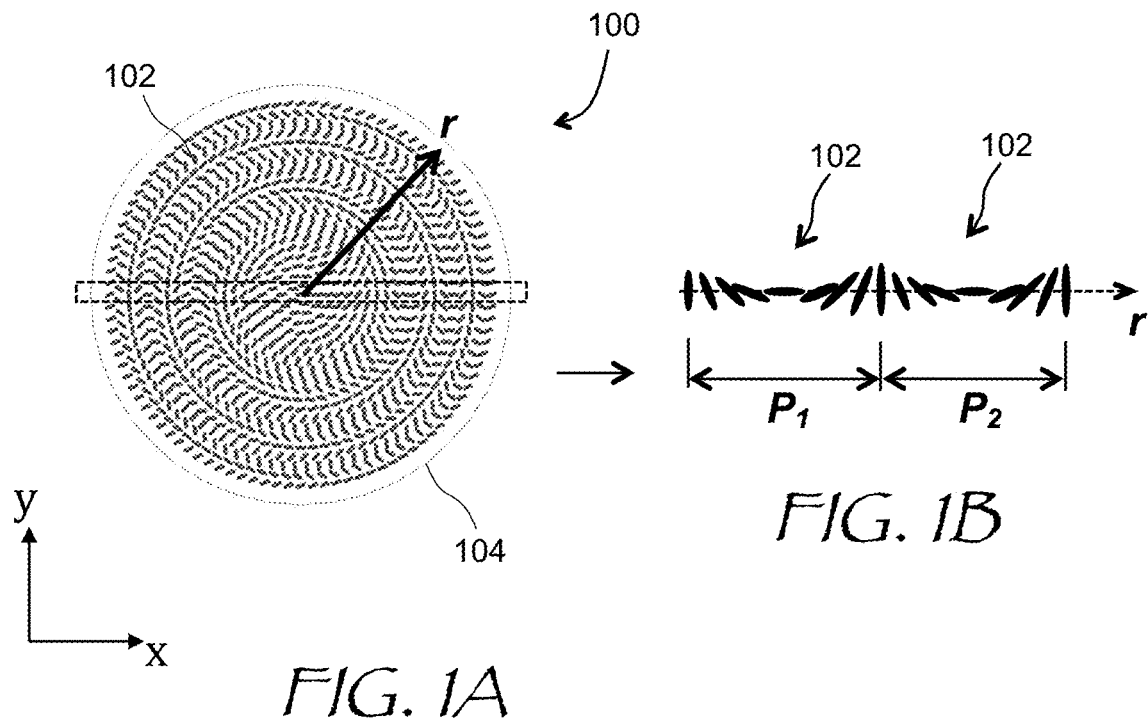
FIG. 1A
FIG. 1B
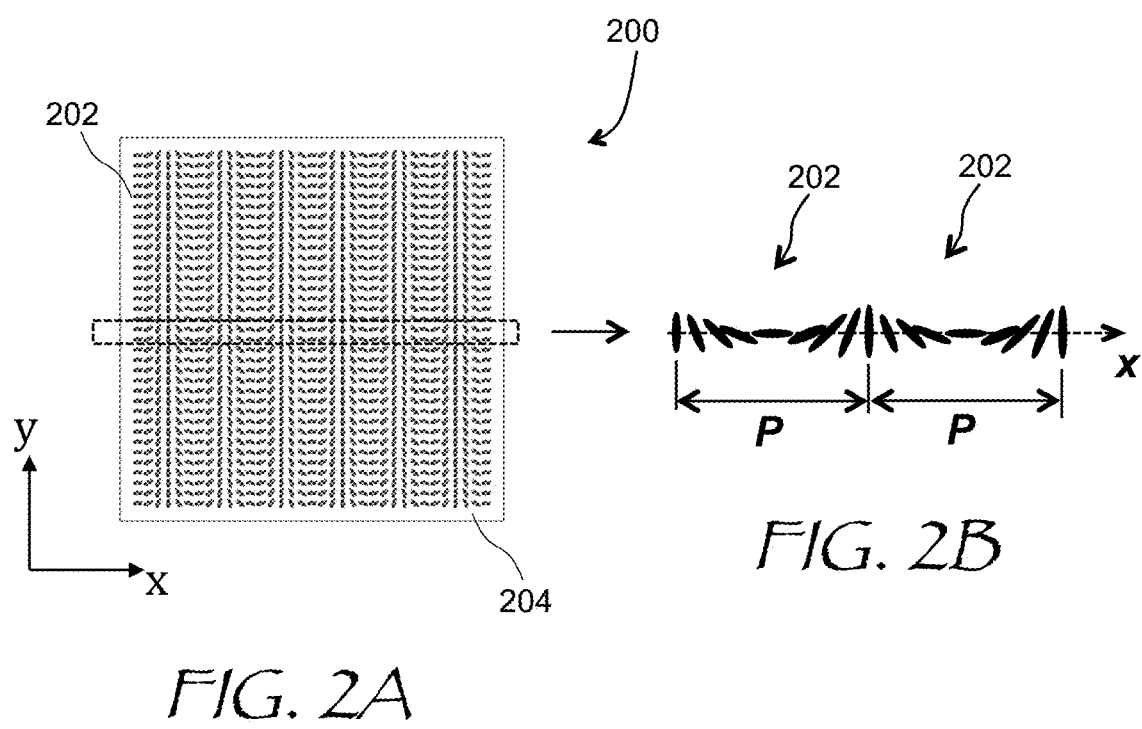
FIG. 2A
FIG. 2B

OFF State

ON State

ACTIVE MULTI-COLOR PBP ELEMENTS

REFERENCE TO RELATED APPLICATIONS

The present invention claims priority from U.S. Patent Application No. 62/658,533, entitled "Active PBP Elements for Head Mounted Displays", filed Apr. 16, 2018 and incorporated herein by reference in its entirety.

TECHNICAL FIELD

The present disclosure relates to visual displays, and in particular to head mounted displays and components therefor.

BACKGROUND

Head mounted displays (HMDs) are used to provide a virtual scenery to a user, or to augment a real scenery with additional information or additional virtual objects or scenery. Stereoscopic images can be displayed e.g. by providing separate images to each eye of the user. In some HMD systems, a head and/or eye position and orientation of the user are tracked, and the simulated scenery displayed is adjusted in real time depending on the user's head orientation and gaze direction, to provide an illusion of the user immersed into a simulated or augmented three-dimensional scenery. Presenting such simulated or augmented scenery to a user can cause visual fatigue and nausea resulting from a limited capability of existing headsets to properly compensate for a discrepancy between eye vergence and eye focusing to accommodate a visual distance, a problem known as vergence-accommodation conflict. The vergence-accommodation conflict appears as a result of changing vergence of eyes of a user depending on what virtual object the user is looking at, while the accommodation of the eyes is generally fixed and set by the distances between electronic display generating virtual images and a lens system projecting the images into user's eyes.

BRIEF DESCRIPTION OF THE DRAWINGS

Exemplary embodiments will now be described in conjunction with the drawings, in which:

FIG. 1A is a frontal view of an active Pancharatnam-Berry phase (PBP) liquid crystal (LC) lens of the present disclosure;

FIG. 1B is a magnified schematic view of LC molecules in an LC layer of the active PBP LC lens of FIG. 1A;

FIG. 2A is a frontal view of an active PBP LC grating of the present disclosure;

FIG. 2B is a magnified schematic view of LC molecules in an LC layer of the active PBP LC grating of FIG. 2A;

DETAILED DESCRIPTION

Figure 3A:
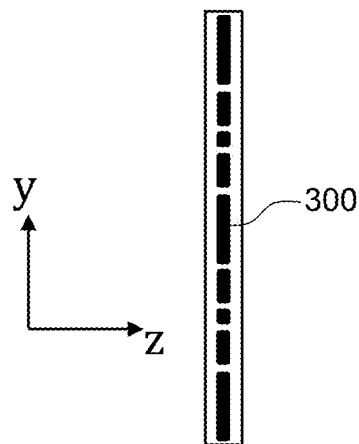
FIGS. 3A and 3B are side views of the active PBP LC lens or grating with in-plane position of the LC molecules in OFF state (FIG. 3A) and vertical position of the LC molecules in ON state (FIG. 3B)

While the present teachings are described in conjunction with various embodiments and examples, it is not intended that the present teachings be limited to such embodiments. On the contrary, the present teachings encompass various alternatives and equivalents, as will be appreciated by those of skill in the art.

To provide a head mounted display with ability to compensate for vergence-accommodation conflict, the lens system of the display should be capable of quick and reliable adjustment of focus. For example, when a virtual scenery involves an approaching object, the changing vergence of the user's eyes needs to be accompanied by an corresponding change of the focusing power of the lens system. As the virtual scenery evolves, the user might direct their gaze towards virtual objects at various distances, with different vergence. The focusing power of the lens will need to be quickly adjusted for vergence in each gaze direction. The lens can be small enough for near-eye placement. Devices other than lenses, e.g. beam redirecting devices, may also be placed near eye to achieve various effects as described herein.

In accordance with the present disclosure, there is provided an active liquid crystal (LC) Pancharatnam-Berry phase (PBP) device comprising first and second active LC PBP components. The first active LC PBP component comprises a first LC layer having a first retardation substantially equal to: an odd number of half wavelengths of a first color channel; and an even number of half wavelengths of a second color channel. The second active LC PBP component comprises a second LC layer having a second retardation substantially equal to: an odd number of half wavelengths of the second color channel; and an even number of half wavelengths of the first color channel.

The active LC PBP device may further include a third active LC PBP component comprising a third LC layer having a third retardation substantially equal to: an odd number of half wavelengths of a third color channel; an even number of half wavelengths of the first color channel; and an even number of half wavelength of the second color channel. The first retardation of the first LC layer can be substantially equal to an even number of half wavelengths of the third color channel, and the second retardation of the second LC layer can be substantially equal to an even number of half wavelengths of the third color channel, where the first, the second, and the third color channels correspond to red, green, and blue color channels respectively. A first birefringent compensation layer, e.g. a c-plate having an extraordinary optical axis perpendicular to the c-plate, may be provided for lessening off-axis variation of the first retardation. The first active LC PBP component, the second active LC PBP component, and the first birefringent compensation layer may form an optical stack. A second birefringent compensation layer may also be provided for lessening off-axis variation of the second retardation of the second active LC PBP component, such that the first birefringent compensation layer, the first active LC PBP component, the second birefringent compensation layer, and the second active LC PBP component form an optical stack.

In one embodiment, the first and second active LC PBP components each comprise an active LC PBP lens for a near-eye application. The active LC PBP device may include a first active compensating LC PBP component having a first compensating LC layer having LC molecules oriented in-plane and perpendicular to in-plane LC molecules in corresponding portions of the first LC layer, to compensate for birefringence of the first LC layer across a clear aperture of the first LC layer. A second active compensating LC PBP component may be provided, having a second compensating LC layer having LC molecules oriented in-plane and perpendicular to in-plane LC molecules in corresponding portions of the second LC layer, to compensate for birefringence of the second LC layer across a clear aperture of the second LC layer. An LC PBP grating may be disposed between the active LC PBP components and the active compensating LC PBP components. The first and second active LC PBP components may each include an active LC PBP grating for a near-eye application.

In one embodiment, the active LC PBP device further includes a switchable polarization rotator disposed downstream of the first, second, and third active LC PBP components, and a circular polarizer disposed downstream of the switchable polarization rotator. The active LC PBP device may include a first switchable polarization rotator disposed downstream of the first, second, and third active LC PBP components; fourth, fifth, and sixth active LC PBP components disposed downstream of the first switchable polarization rotator, each one of the fourth, fifth, and sixth active LC PBP components comprising an LC layer having a retardation substantially equal to an odd number of half wavelengths at a respective one of the color channels, while having a retardation substantially equal to even numbers of half wavelengths at remaining two of the color channels; a second switchable polarization rotator disposed downstream of the fourth, fifth, and sixth active LC PBP components; and a circular polarizer disposed downstream of the second switchable polarization rotator. Each active LC PBP components may include an active LC PBP lens or grating for a near-eye application. A head mounted display, e.g. a near-eye display, may include any of the above active LC PBP components.

In accordance with the disclosure, there is further provided a method of redirecting or refocusing a light beam comprising first and second color channels. The method includes propagating the light beam through a first LC layer of a first active LC PBP component, the first LC layer having a first retardation substantially equal to: an odd number of half wavelengths of the first color channel; and an even number of half wavelengths of the second color channel; and propagating the light beam through a second LC layer of a second active LC PBP component, the second LC layer having a second retardation substantially equal to: an odd number of half wavelengths of the second color channel; and an even number of half wavelengths of the first color channel. The method may further include energizing the first and second active LC PBP components to redirect or refocus the light beam. In one embodiment, the light beam is propagated through at least one c-plate having an extraordinary optical axis perpendicular to the c-plate.

Referring now to FIG. 1A, an active Pancharatnam-Berry phase (PBP) LC lens 100 includes LC molecules 102 in a liquid crystal layer 104. The LC molecules 102 are disposed in XY plane at a varying in-plane orientation depending on the distance r from the lens center. The orientation angle $\phi(r)$ of the LC molecules 102 in the liquid crystal layer 104 of the PBP LC lens 100 is given by $$\phi(r) = \frac{\pi r^2}{2 f_o \lambda_o} \tag{1a}$$

where $f_o$ is a desired focal length and $\lambda_o$ is wavelength. The optical phase delay in the PBP LC lens 100 is due to Pancharatnam-Berry phase, or geometrical phase effect. An optical retardation R of the liquid crystal layer 104 having a thickness t is defined as R=tΔn, where Δn is the optical birefringence of the liquid crystal layer 104. At the optical retardation R of the LC layer 104 of $\lambda_o/2$, i.e. half wavelength, the accumulated phase delay P(r) due to the PBP effect can be expressed rather simply as P(r)=2$\phi$(r), or, by taking into account Eq. (1a) above, $$P(r) = \frac{\pi r^2}{f_o \lambda_o} \tag{1b}$$

It is the quadratic dependence of the PBP P(r) on the radial coordinate r that results in the focusing, or defocusing, function of the LC PBP lens 100. This is different from a conventional LC spatial phase modulator (SLM), which utilizes changes in the tilt angle to provide a spatial phase distribution, and often has a discontinuity at a boundary of 2π modulo. A PBP device, such as the PBP lens 100, has the azimuthal angle $\phi$ continuously and smoothly varying across the surface of the LC layer 104 as illustrated in FIG. 1B. Accordingly, the mapping of the azimuthal angle to PBP, i.e. P(r)=2$\phi$(r) when R=$\lambda_o/2$, allows for a more drastic phase change without introducing discontinuities at a boundary of 2π modulo typically present in a conventional LC SLM.

Referring to FIG. 2A, an active PBP LC grating 200 includes LC molecules 202 in an LC layer 204. The LC molecules 202 are disposed in XY plane at a varying in-plane orientation depending on the X coordinate. The orientation angle $\phi(x)$ of the LC molecules 202 in the PBP LC grating 200 is given by $$\phi(x) = \pi x/T = \pi x \sin\theta/\lambda_o \tag{2}$$

where θ is a diffraction angle given by $$\theta = \sin^{-1}(\lambda_o/T) \quad (3)$$

where T is pitch of the grating 200. The azimuthal angle φ varies continuously across the surface of an LC layer 204 as illustrated in FIG. 2B, with a constant period P. By comparison, the period of the azimuthal angle φ variation in FIG. 1B is not constant, i.e. $P_1$ is generally not equal to $P_2$. The optical phase delay P in the PBP LC grating 200 of FIG. 2A is also due to the PBP effect, i.e. $P(r)=2\phi(x)$ when $R=\lambda_o/2$.

Figure 3B:
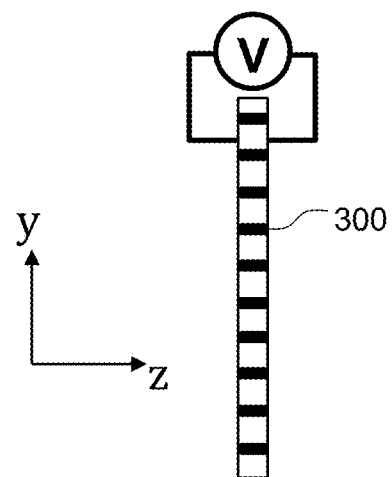

The PBP LC lens 100 and PBP LC grating 200 are examples of active PBP LC devices, in which the orientation of the LC molecules can be affected by an applied electric field. In a normal state, the LC molecules orientation is determined by an alignment layer, which has been illuminated with polarized light, typically UV light, such that the LC molecules are aligned in accordance with the polarization direction of the UV light used to cure the alignment layer. The pattern of UV light, used to obtain the required spatial distribution of polarization, can be generated by employing optical interference. Referring to FIG. 3A, LC molecules 300 are aligned by the alignment layer in-plane, as shown. When the electric field is applied across the LC layer, the LC molecules 300 of a positive LC material will align preferably along the electric field lines, causing the molecules to orient out-of-plane as shown in FIG. 3B, thereby erasing or considerably reducing the PBP effect. It is to be noted that a negative LC material, in which LC molecules orient preferably perpendicularly to the electric field lines, may also be used, in which case the action of the applied electric field is reversed.

Figure 4A:
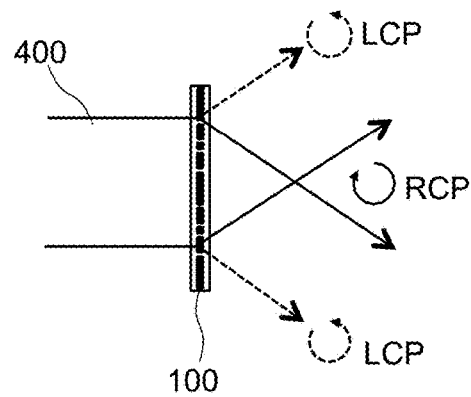
FIGS. 4A and 4B are side schematic views of the active PBP LC lens of FIG. 1A, showing light propagation in OFF (FIG. 4A) and ON (FIG. 4B) states, depending on polarization of incoming light.
Figure 4B:
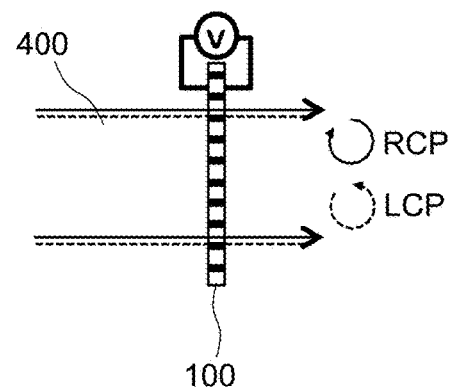

Optical performance of the active PBP LC lens 100 is illustrated in FIGS. 4A and 4B. In FIG. 4A, the active PBP LC lens 100 is in OFF state, such that its LC molecules are disposed predominantly in-plane. In the embodiment shown, the optical retardation of the active PBP LC lens 100 is a half wavelength; thus, the active PBP LC lens 100 acts as a half-wave waveplate with spatially varying fast axis, changing the polarization of incoming light from left-circular polarized (LCP) to right-circular polarized (RCP), and vice versa. A sign, or direction, of the phase profile of a PBP device depends on polarization. By way of example, when an incoming optical beam 400 is left-circular polarized (LCP), the phase delay at the lens center decreases toward the periphery of the LC PBP lens 100, such that the PBP LC lens 100 focuses the beam 400, which becomes right-circular polarized (RCP). The focused RCP beam 400 is shown with solid lines. When an incoming optical beam 400 is right-circular polarized (RCP), the phase delay at the lens center increases toward the periphery of the LC PBP lens 100, such that the PBP LC 100 defocuses the beam 100, which becomes left-circular polarized (LCP). The defocused LCP beam 400 is shown with dashed lines. Applying a voltage to the PBP LC lens 100 reorients the LC molecules as shown in FIG. 4B. As a result, the optical beam 400 remains unfocused, whether it is LCP or RCP. Thus, the active PBP LC lens 100 of FIG. 1A has a varifocal lens property.

Figure 4C:
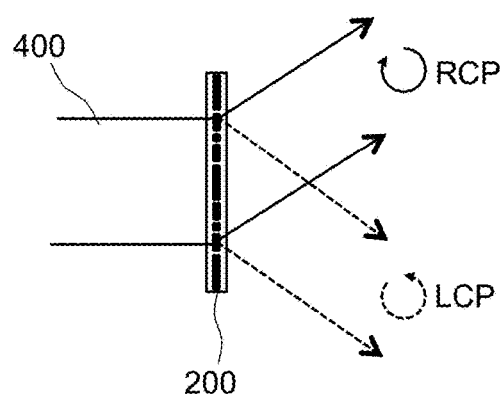
FIGS. 4C and 4D are side schematic views of the active PBP LC grating of FIG. 2A, showing light propagation in OFF (FIG. 4C) and ON (FIG. 4D) states, depending on polarization of incoming light.
Figure 4D:
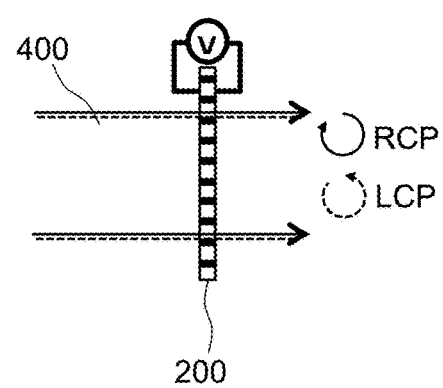

Optical performance of the active PBP LC grating 200 is illustrated in FIGS. 4C and 4D. In FIG. 4C, the active PBP LC grating 200 is in OFF state, such that its LC molecules are disposed predominantly in-plane. When an incoming optical beam 400 is left-circular polarized (LCP), the PBP LC grating 200 redirects the beam 400 upwards, which becomes right-circular polarized (RCP). The RCP deflected beam 400 is shown with solid lines. When an incoming optical beam 400 is right-circular polarized (RCP), the PBP LC 100 redirects the beam 400 downwards, which becomes left-circular polarized (LCP). The LCP deflected beam 400 is shown with dashed lines. Applying a voltage to the PBP LC grating 200 reorients the LC molecules as shown in FIG. 4D. As a result, the optical beam 400 retains its original direction, whether it is LCP or RCP. Thus, the active PBP LC grating 200 has a variable beam steering property.

Figure 5A:
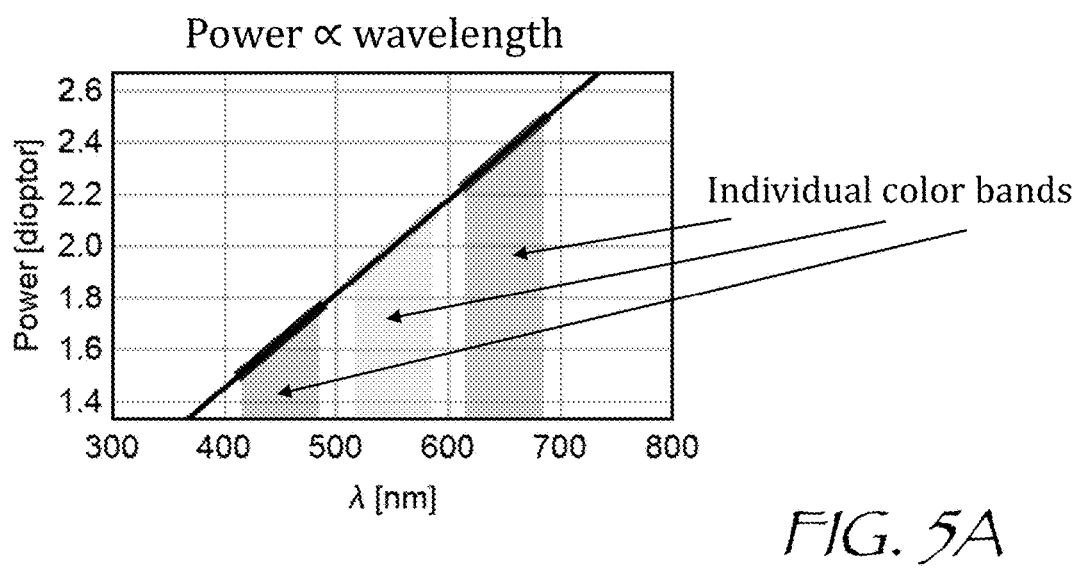
FIGS. 5A and 5B are spectral plots of optical power (FIG. 5A) and focal length (FIG. 5B) of a single-layer PBP LC lens.
Figure 5B:
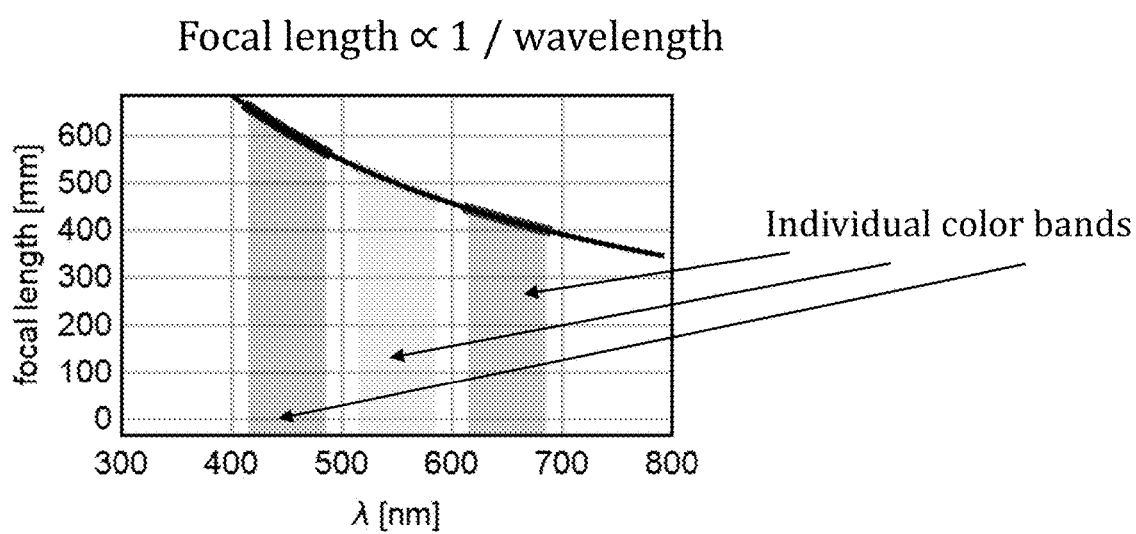
Figure 6A:
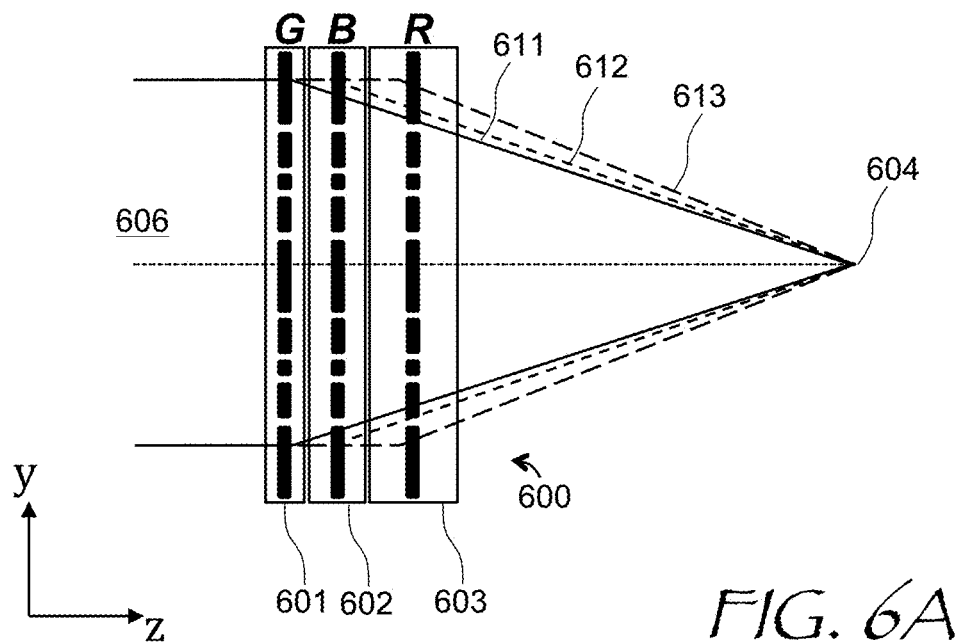
FIGS. 6A and 6B are schematic side views of a three-layer active PBP LC lens in a focusing state (FIG. 6A) and a non-focusing state (FIG. 6B)

PBP LC devices may exhibit a wavelength dependence of performance. It follows from Eq. (1a) that a PBP LC lens having an LC director profile φ(r) will exhibit optical power in Diopter directly proportional to the wavelength λ, as shown in FIG. 5A. Equivalently, a PBP LC lens having an LC director profile φ(r) will exhibit focal length inversely proportional to the wavelength λ, as shown in FIG. 5B. If such a lens were used to collimate and direct light from a color display, which typically has three primary color channels, only one color channel would appear in-focus to the viewer. To make sure that all three color channels are focused correctly, a stack of three lenses may be used, one for each color channel. By way of a non-limiting example, referring to FIG. 6A, an active LC PBP device 600 is a stack including three active, or switchable, LC PBP lens components: G lens component 601 for green color, B lens component 602 for blue color, and R lens component 603 for red color. To make sure the lens components 601-603 focus light of different colors to a same point 604, a condition $$f_R\lambda_R = f_G\lambda_G = f_B\lambda_B \quad (4)$$

may be imposed. Herein, f denotes the focal length of the corresponding lens component. In FIG. 6A, a green beam component 611 (solid lines) of a beam 606 is focused by the G lens component 601 only; a blue beam component 612 (short-dash lines) is focused by the B lens component 602 only; and a red beam component 613 (long-dash lines) is focused by the R lens component 603 only. To provide zero optical power at wavelengths of the other color channels, the R, G, B lens thicknesses are selected such that their optical retardation at both other wavelengths is integer number of waves, or even number of half wavelengths, resulting in zero PBP and, accordingly, zero optical power at the other two color channels. To provide focusing/defocusing power at the R, G, B channel wavelengths, the R, G, B lens thicknesses are selected such that their optical retardation at their own wavelengths is an odd number of half wavelengths, resulting in a non-zero PBP and, accordingly, a non-zero optical power of the R, G, B lenses.

Figure 6B:
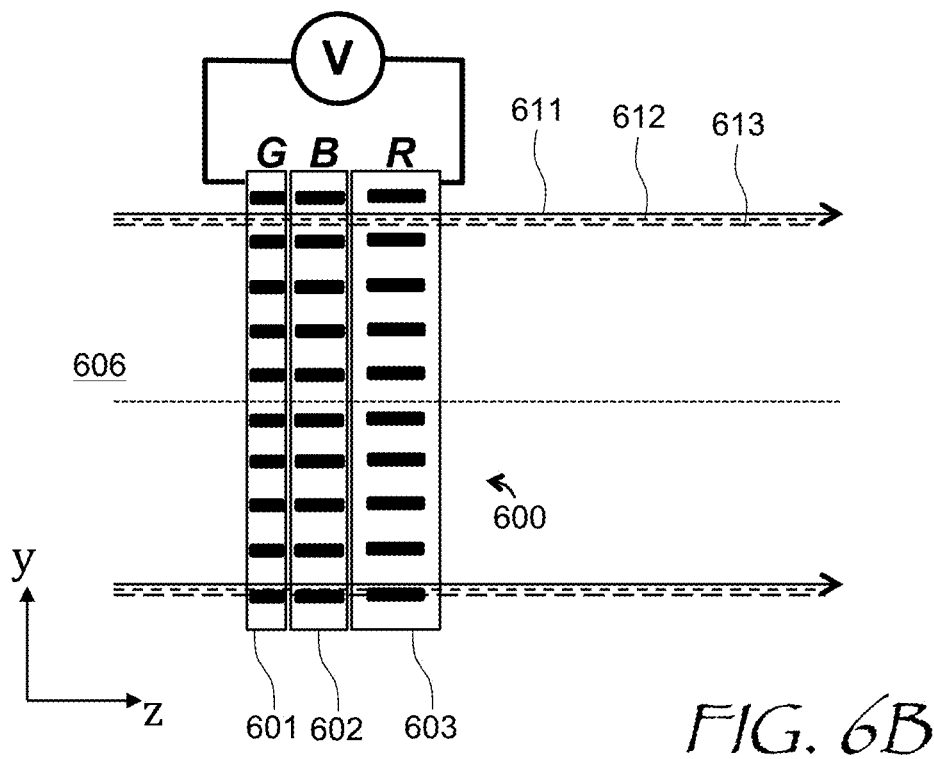

Referring to FIG. 6B, all three lens components 601-603 are in "ON" state, and as a result, the optical power of the active LC PBP device 600 is zero, i.e. the beam 606 retains original collimation. It is to be noted that, even though one voltage V is shown to be applied to the stack of the PBP LC lens components 601-603 for simplicity, in actual implementation the voltage is typically applied separately to each PBP LC lens component 601-603. Furthermore, the amplitudes of the voltages applied to individual PBP LC lens components 601-603 may differ from each other.

The achromatic PBP LC stack configuration described herein may also be applied to active PBP LC gratings, such as active LC PBP grating 200 of FIG. 2A, to obtain beam deflection which does not depend, or at least depends less, on the wavelength of the light beam. It is to be understood that the term "achromatic" is used herein to indicate a reduced dependence of performance of the LC PBP devices on wavelength, and the complete achromaticity may not be achieved due to intra-channel wavelength dependence of optical retardation, which can be seen, for example, in FIGS.

5A and 5B showing the optical power and focal length being non-constant across widths of individual color bands.

Figure 7A:
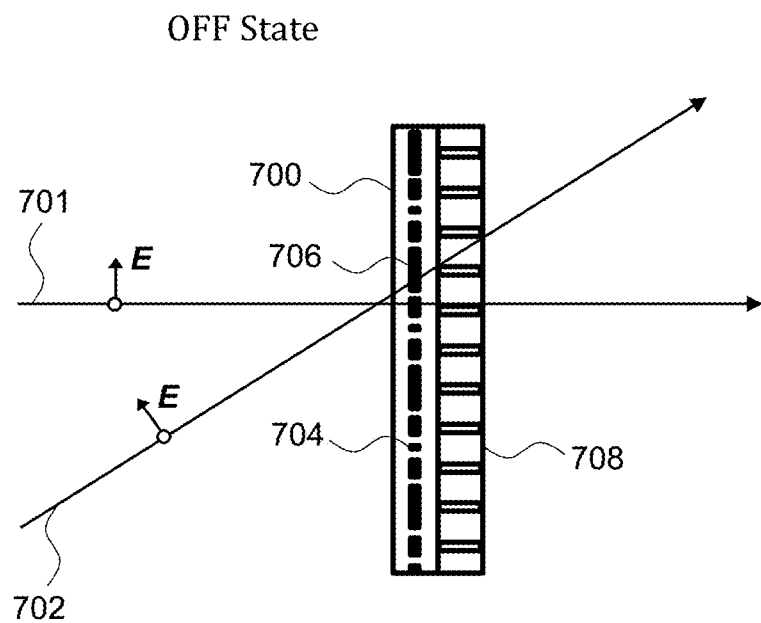
FIGS. 7A and 7B are schematic side views of an active PBP LC device with a c-plate for wide-angle operation.

So far, the performance of the active LC PBP lenses and gratings has been considered on-axis, that is, at normal angle of incidence of an impinging optical beam. At normal incidence, the local retardance of the LC layer is one half of the wavelength, or more generally, an odd number of half wavelengths. However, off-axis, that is, at non-zero angles of incidence of incoming light, the retardation may deviate from half wavelength. By way of example, referring to FIG. 7A, an oblique ray 702 impinges on an active PBP LC device 700, such as a lens or a grating. While the oblique ray 702 may remain perpendicular to some LC molecules 704, the oblique ray 702 is no longer perpendicular to other LC molecules 706, depending on a local orientation of the LC molecules. The non-perpendicular angle of incidence causes a local refractive index to change. This happens because the refractive index is at maximum when the electric field vector E of the light beam is parallel to a dipole direction of the LC molecule, which is often the longitudinal direction of the LC molecules ("positive" LC molecules). For orthogonal (out of plane of FIGS. 7A and 7B) electric field vector shown in FIGS. 7A and 7B with small circles, the refractive index is smaller, which causes birefringence. Therefore, the birefringence is at maximum for a direct ray 701 at normal angle of incidence impinges on the PBP LC device 700.

Figure 7B:
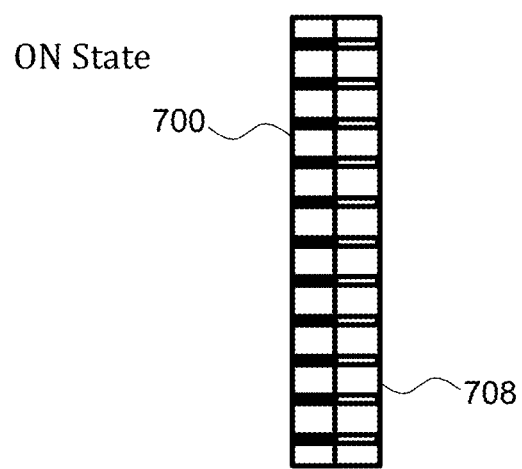

For the oblique ray 702, the electric field vector E of the light beam is no longer parallel to a dipole direction of the LC molecule 706. As a result, the maximum refractive index reduces in magnitude, while the refractive index for the orthogonal E-field stays approximately the same, which causes the reduction of birefringence. Consequently, when the optical retardation R of the LC layer is ½ wavelength for the normal ray 701, the optical retardation R of the LC layer is (½−Δ[θ]) waves, where θ is the angle of incidence and A is the reduction of optical retardation due to reduction of birefringence. To offset or compensate this effect, a so-called c-plate 708, i.e. a sheet of birefringent material having a polarization axis perpendicular to the plane of the sheet, may be added to at least one lens of the stack. The c-plate 708 tends to offset the reduction of the effective refractive index of the PBP LC device 700, because for the oblique ray 702, the c-plate 708 birefringence change $\Delta'[\theta]$ is of opposite sign: $\Delta'[\theta] \approx -\Delta[\theta]$. As a result, the optical retardation R is brought back to half the wavelength, which reduces the dependence of performance of the PBP LC device 700 on angle of incidence and increases its acceptance angle. When the PBP LC device 700 is in "ON" state, the polarization axes of the PBP LC lens 700 and the C-plate 708 are parallel as shown in FIG. 7B.

Figure 8A:
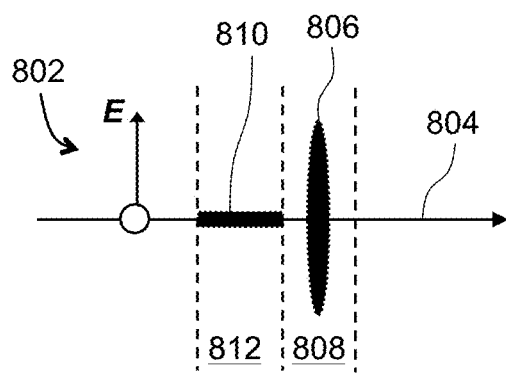
FIGS. 8A and 8B are schematic diagrams illustrating the compensating effect of the c-plate of FIG. 7A.
Figure 8B:
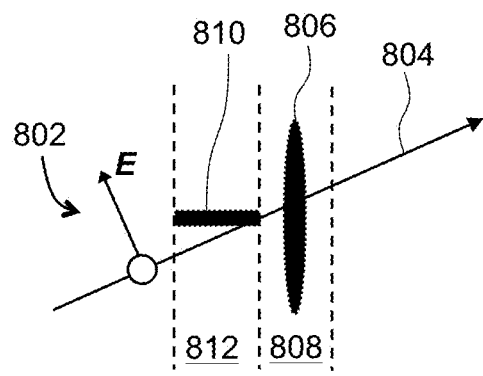

The point of reduction of off-axis variation of optical retardation is further illustrated in FIGS. 8A and 8B. Two scenarios are considered. At normal angle of incidence (FIG. 8A), an electric field vector 802 of an incoming optical beam 804 is parallel to an LC molecule 806 of an LC layer 808 and perpendicular to an axis of birefringence 810 of a c-plate 812. Accordingly, the effective refractive index of the LC layer, and associated birefringence, is at maximum, and the effective refractive index of the c-plate 812 is at minimum. At an oblique angle of incidence (FIG. 8B), the electric field vector 802 is no longer parallel to the LC molecule 806, which causes a reduction of the refractive index of the LC layer and the reduction of the associated birefringence. However, the effective refractive index of the c-plate 812 increases, offsetting the reduction of refractive index of the LC layer.

Figure 9:
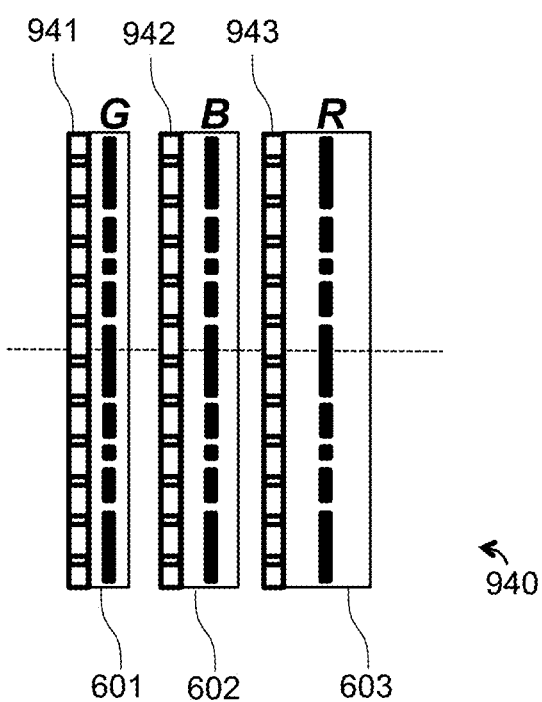
FIG. 9 is a schematic side view of an active achromatic PBP LC device with a c-plate for wide-angle operation.

C-plates, or more generally retardation sheets, may be provided for any active LC PBP device described herein. For example, referring to FIG. 9, a wide-angle achromatic LC PBP lens stack 940 includes a retardation sheet 941, 942, 943 for each active LC PBP lens component 601, 602, 603. The c-plates of retardation sheets can also be provided for achromatic LC grating. Furthermore, in some embodiments, the birefringence axis direction of the retardation sheets may be at oblique angle to the plane of the retardation sheet, depending on a particular application.

Figure 10:
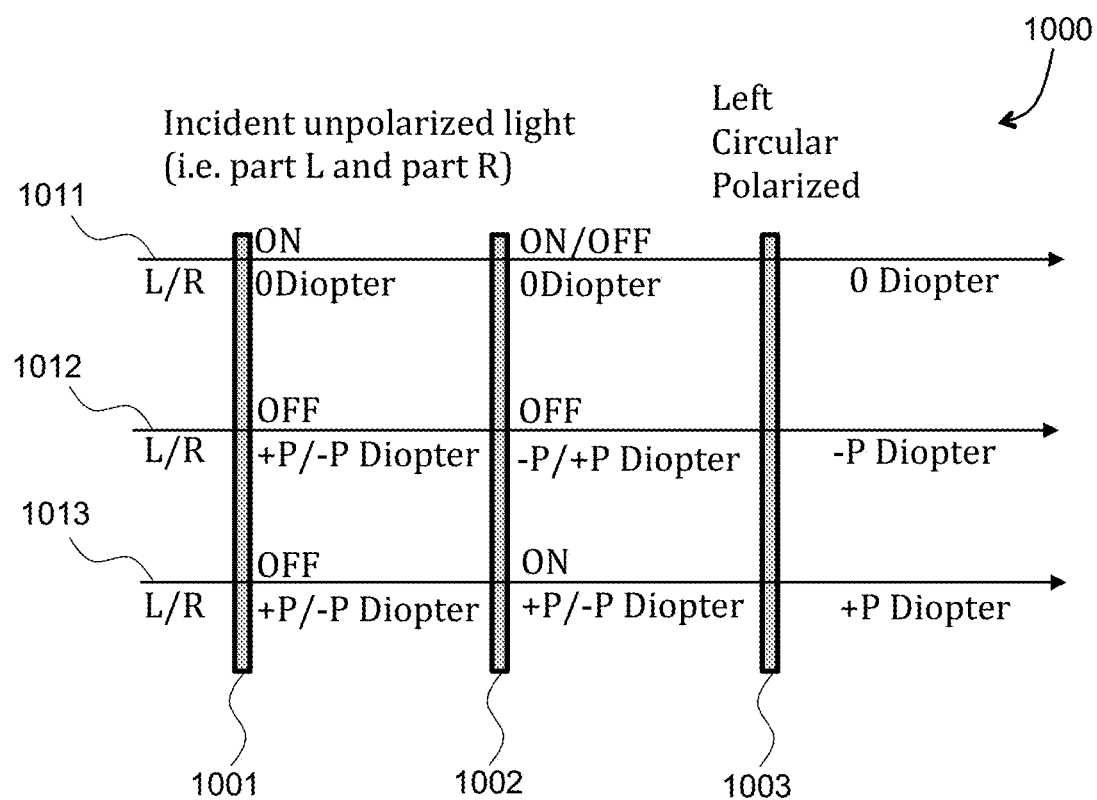
FIG. 10 is a schematic side view of an optical stack capable of three switchable focusing powers.

In accordance with the disclosure, the above described active PBP LC lenses may be used to construct a varifocal lens having switchable optical power, i.e. switchable focusing/defocusing power. Several focal lengths can be provided. Referring to FIG. 10, an optical stack 1000 includes an active PBP LC lens 1001, an LC switchable half-wave waveplate 1002, and a left-circular polarizer 1003. In this example, the active PBP LC lens 1001 includes positive LC material, although a negative LC material could be used. The input light is not polarized, i.e. it includes both left-handed circular (L) and right-handed circular (R) polarizations. When the PBP LC lens 1001 is in "ON" state, i.e. when the electric field is applied, the PBP structure defined by Eq. (1) is erased, thus the PBP LC lens 1001 has optical power of 0 Diopters. In this state, as denoted at 1011, the optical power of the entire stack 1000 is 0 Diopters, i.e. the light remains unfocused. When the PBP LC lens 1001 is in "OFF" state, i.e. when the electric field is not applied, the PBP LC orientation defined by Eq. (1) is present, providing the optical power of P diopters for L-polarized light and −P diopters for R-polarized light. When the switchable half-wave waveplate 1002 is in OFF state, i.e. when the electric field is not applied, the half-wave retardation is present, as denoted at 1012. As a result, the R-polarized light at the optical power −P diopters becomes L-polarized light, which is passed through the left-circular polarizer 1003. Thus, the stack 1000 has the optical power of −P diopters. When the switchable half-wave waveplate 1002 is in ON state, i.e. when the electric field is applied, the half-wave retardation is erased, and the L-polarized light remains L-polarized, as denoted at 1013. Thus, the stack 1000 has the optical power of +P diopters.

In one embodiment, the PBP LC lens 1001 includes an achromatic optical stack, similar to the device 600 of FIGS. 6A, 6B. The achromatic optical stack may further include retardation sheets/c-plates for wide-angle performance, such as in the lens stack 940 of FIG. 9. The above principles can also be applied to building achromatic wide-angle PBP LC grating stacks.

Figure 11:
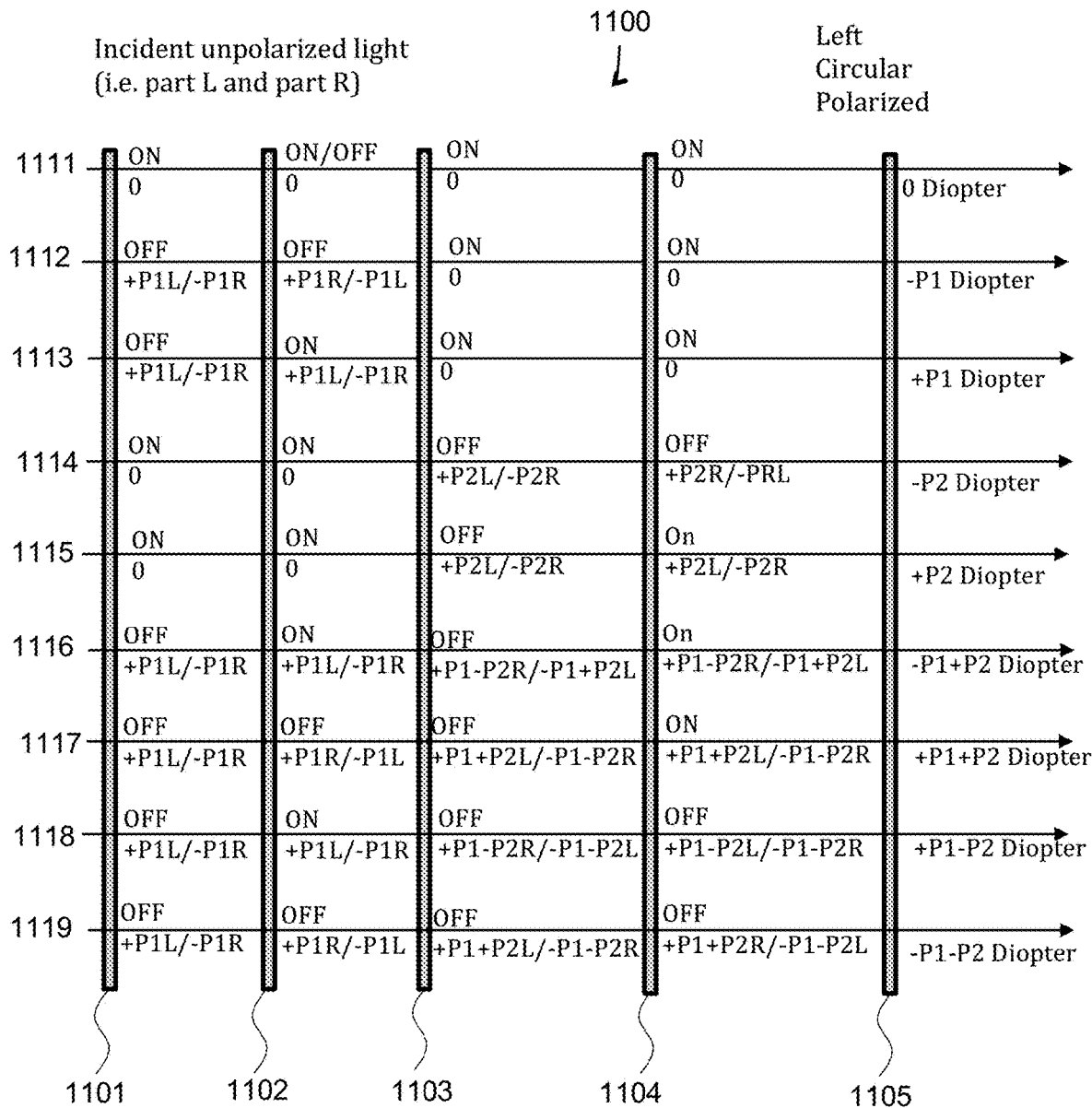
FIG. 11 is a schematic side view of an optical stack capable of nine switchable focusing powers.

By combining more switchable PBP LC devices and switchable half-wave waveplates, the number of switchable states can be further increased. Referring to FIG. 11, an optical stack 1100 includes first 1101 and second 1103 PBP LC lenses, first 1102 and second 1104 LC switchable half-wave waveplates, and a left-circular polarizer 1105. In this example, the PBP LC lenses 1101 and 1103 include positive LC material for certainty, although a negative material could be used. The input light is not polarized, i.e. it includes both left-handed circular (L) and right-handed circular (R) polarizations. When both PBP LC lenses 1101 and 1103 are in "ON" state, their optical power is zero, and as a result, the optical power of the entire stack 1100 is zero (state 1111) regardless of the state of the waveplates 1102 and 1104. When the first PBP LC lens 1101 is in "OFF" state, the local retardation of the layer is half-wave and accordingly, the first PBP LC lens 1101 has a non-zero optical power e.g. +P1 for L-polarized light (+P1L) and −P1 for R-polarized light (−P1R). Then, depending on the state of the first LC switchable half-wave waveplate 1102, the resulting optical power of the stack 1100 can be −P1 Diopter (state 1112) or +P1 Diopter (state 1113). Similarly, when the second PBP LC lens 1103 is in "OFF" state, it has a non-zero optical power e.g. +P2 for L-polarized light (+P2L) and −P2 for R-polarized light (−P2R). Then, depending on the state of the second LC switchable half-wave waveplate 1104, the resulting optical power of the stack 1100 can be −P2 Diopter (state 1114) or +P2 Diopter (state 1115). In the remaining states 1115-1119 of the stack 1100, the first 1101 and second 1103 PBP LC lenses are in "OFF" state and thus always provide non-zero optical power depending on polarization. Depending on the state of the first 1102 and second 1104 LC switchable half-wave waveplates, the resulting optical powers become:

- −P1 +P2 Diopter (state 1116, the first waveplate 1102 is ON and the second waveplate 1104 is ON);
- +P1 +P2 Diopter (state 1117, the first waveplate 1102 is OFF and the second waveplate 1104 is ON);
- +P1 −P2 Diopter (state 1118, the first waveplate 1102 is ON and the second waveplate 1104 is OFF);
- −P1 −P2 Diopter (state 1119, the first waveplate 1102 is OFF and the second waveplate 1104 is OFF).

The principle of forming the stack having a switchable optical performance can also be applied to the active LC PBP grating 200 of FIG. 2A, only in case of the gratings, the switched parameter is the deviation angle of the optical beam exiting the stack. For example, by replacing LC PBP lenses with LC PBP gratings in the stack 1000 of FIG. 10, a device with three switchable deflection angles can be obtained. By replacing LC PBP lenses with LC PBP gratings in the stack 1100 of FIG. 11, a device with nine switchable deflection angles can be obtained. The deflection angles are not limited to deflections along a single line. The orientations of the grating within a grating stack do not need to align in the same direction. In some configurations, depending on the orientation of the grating(s), the multiple deflections can deviate from deflection along single lines. By way of a non-limiting example, the multiple deflections can form a geometrical shape such as a square or a diamond. Furthermore, by combining more active LC PBP components with corresponding active waveplates, stacks having more switchable focal lengths/deflection angles may be provided.

In one embodiment, the active PBP LC lenses 1101 and 1103 include achromatic optical stacks, similar to the device 600 of FIGS. 6A, 6B. For example, the first active PBP LC lens 1101 may include the first 601, second 602, and third 603 active LC PBP lens components (FIG. 6A) forming a first achromatic stack, and the second active PBP LC lens 1102 may include fourth, fifth, and sixth PBP LC lens components forming a second achromatic stack. The achromatic optical stack(s) may further include multi-layer retardation sheets, c-plates, or twisted LC structure for lessening off-axis variation of the retardation of the stack, such as in the lens stack 940 of FIG. 9. The above principles can also be applied to building achromatic wide-angle PBP LC grating stacks.

In accordance with the present disclosure, the active LC PBP devices described herein may be used in near-eye applications, such as virtual reality (VR) or augmented reality (AR) glasses. By way of a non-limiting example, a near-eye VR display module 1200A of FIG. 12A includes an electronic display 1202, collimating optics 1204, an in-coupling grating 1206, a waveguide 1208, an out-coupling grating 1210, and a lens stack 1212. In operation, an image generated by the electronic display 1202 is projected by the collimating optics 1204 onto the in-coupling grating 1206, which redirects image light 1214 to propagate in the waveguide 1208 towards the out-coupling grating 1210. The out-coupling grating 1210 redirects the image light 1214 towards the lens stack 1212, which collimates the image light 1214 and directs the image light 1214 to a user's eye 1216. In an embodiment, the lens stack 1212 includes active LC PBP device, e.g. a varifocal lens based on the lens 1000 of FIG. 10 or the lens 1100 of FIG. 11. The in-coupling grating 1206 and/or the out-coupling grating 1210 can also include a passive grating and/or an active, i.e. switchable grating such as the grating 200 of FIG. 2A.

Figure 12A:
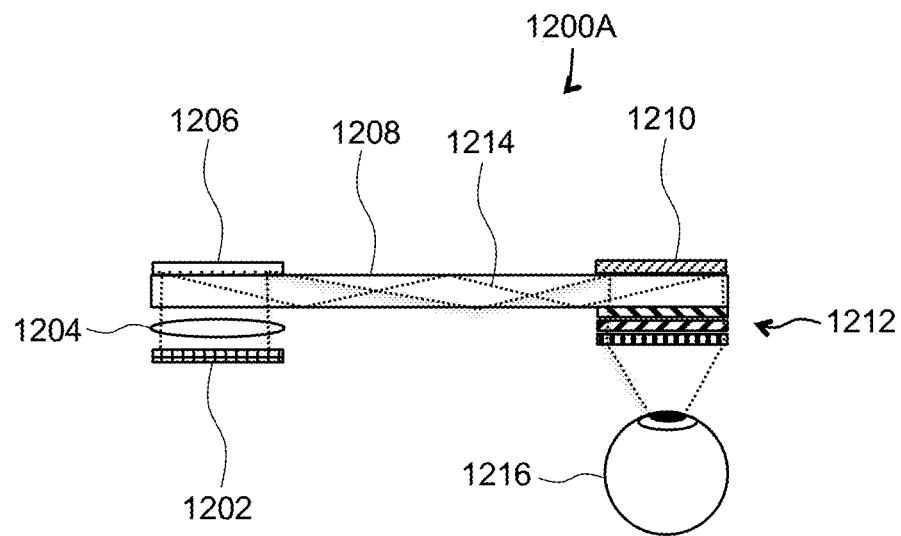
FIG. 12A is a side cross-sectional view of a near-eye virtual reality (VR) display module.
Figure 12B:
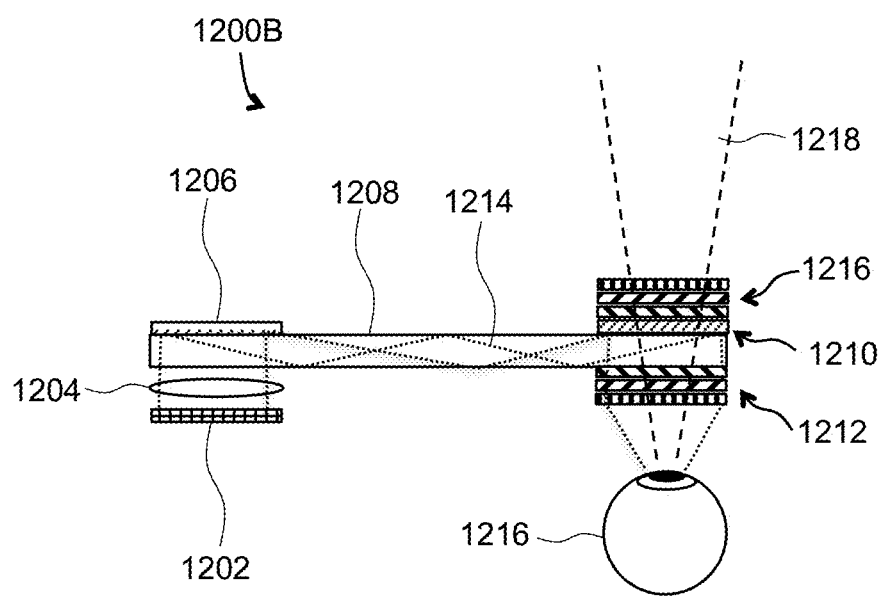
FIG. 12B is a side cross-sectional view of a near-eye augmented reality (AR) display module.

Turning to FIG. 12B, a near-eye AR display module 1200B is similar to the near-eye VR display module 1200A of FIG. 12A. The near-eye AR display module 1200B further includes a compensating lens stack 1216 including an active compensating LC PBP component for each corresponding active LC PBP component of the lens stack 1212. Each active compensating LC PBP component may include a compensating LC layer having LC molecules oriented in-plane and perpendicular to in-plane LC molecules in corresponding portions of the corresponding LC layer, to locally compensate for birefringence of that LC layer. For example, referring back to FIG. 1A, an active compensating LC PBP lens for the active LC PBP lens 100 may have LC molecules with a spatially variant in-plane orientation, such that the LC molecules of the active compensating LC PBP lens are perpendicular to the LC molecules of the active LC PBP lens 100 at each location given by corresponding x,y coordinates. When light propagates through both lenses, the local birefringence and thus the PBP-generated optical power of the active LC PBP lens 100 is fully compensated across the clear aperture of the active LC PBP lens 100, such that the lens pair has zero optical power, being equivalent to a mere plane slab of glass.

As noted above with reference to FIG. 12B, the compensating lens stack 1216 may include a compensating LC layer for each LC layer of the lens stack 1212. For example, when the lens stack 1212 has first and second active LC PBP components having corresponding first and second LC layers, the compensating lens stack 1216 may have first and second active compensating LC PBP components, each having a corresponding first and second compensating LC layer having LC molecules oriented in-plane and perpendicular to the in-plane LC molecules in corresponding portions of the corresponding first and second LC layers of the first and second active LC PBP components, to compensate for birefringence of those LC layers across the entire clear aperture of the first and second active LC PBP components. This allows the optical power of the entire lens stack 1212 to be completely compensated for external light 1218 from real objects propagating through both stacks 1212 and 1216, enabling the user to see those objects undistorted as if viewed through a plane transparent or translucent slab of glass. When some or all of the LC PBP components of the lens stack 121 are energized, the corresponding LC PBP components of the compensating lens stack 1216 are also energized, to keep the optical power, i.e. focusing/defocusing power, at zero for the external light 1218. It is further noted that the out-coupling LC PBP grating 1210 disposed between the lens stacks 1212 and 1216 allows the light from the real objects to be superimposed with the image light 1214 representing artificial or virtual objects, thus seamlessly augmenting the real world imagery with artificial or virtual objects.

Figure 13:
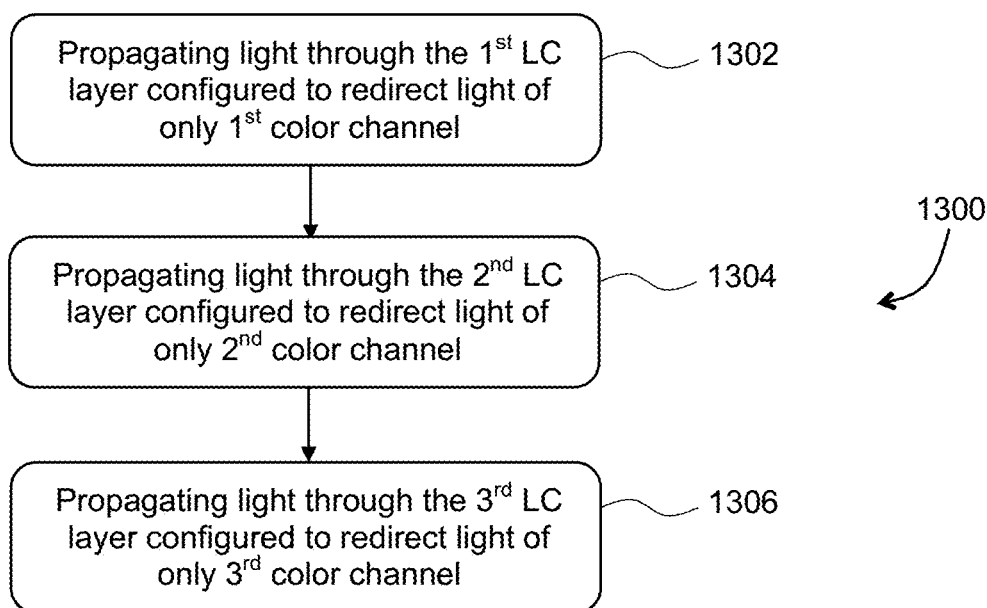
FIG. 13 is a flow chart of a method for redirecting a light beam using an LC PBP device of the present disclosure.

Referring now to FIG. 13, a method 1300 of redirecting a light beam comprising first and second color channels includes propagating (1302) the light beam through a first LC layer of a first active LC PBP component, e.g. the G lens 601 of the active LC PBP device 600 of FIG. 6A; propagating (1304) the light beam through a second LC layer of a second active LC PBP component, e.g. the B lens 602, and optionally propagating (1306) the light beam through a third LC layer of a third active LC PBP component, e.g. such as the R lens 603. In one embodiment, the method 1300 may include propagating the light beam through at least one c-plate having an extraordinary optical axis perpendicular to the c-plate, such as the c-plate 941, 942, or 943 of FIG. 9. The method 1300 may also include energizing the first and second active LC PBP components to redirect or refocus the light beam, as explained above with reference to FIGS. 1A, 2A, 4A-4C, 10, and 11, and energizing corresponding switchable half-wave waveplates or polarization rotators.

Figure 14:
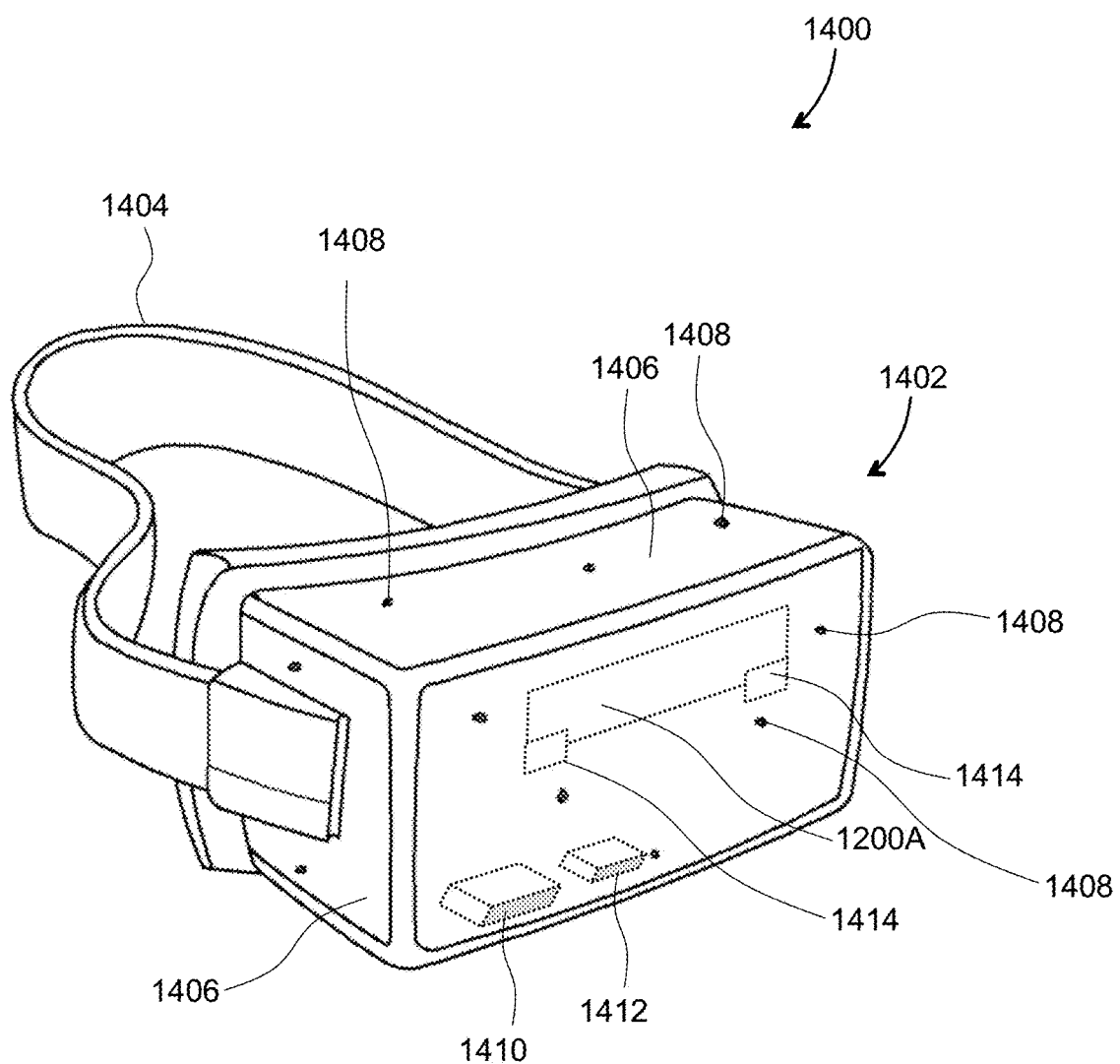
FIG. 14 is an isometric view of a head-mounted display (HMD) incorporating an active LC PBP device of the present disclosure.

Turning now to FIG. 14, a head-mounted display (HMD) 1400 may include active LC PBP devices described above, such as lenses, lens systems or stacks, gratings, and/or display modules. The HMD 1400 may provide content to a user as a part of an artificial reality system. The HMD 1400 may augment views of a physical, real-world environment with computer-generated imagery and/or to generate entirely virtual 3D imagery. The HMD 1400 may include a front body 1402 and a head band 1404. The front body 1402 is configured for placement in front of eyes of a user, and the head band 1404 may be stretched to secure the front rigid body on the user's head. A display module, such as the near-eye VR display module 1200A of FIG. 12A or AR display module 1200B of FIG. 12B, may be disposed in the front body 1402 for presenting imagery to the user. The VR display module 1200A is shown in FIG. 14 as an illustration only. Sides 1406 of the front body 1402 may be opaque or transparent.

In some embodiments, the front body 1402 includes locators 1408, an inertial measurement unit (IMU) 1410 for tracking acceleration of the HMD 1400, and position sensors 1412 for tracking position of the HMD 1400. The locators 1408 are traced by an external imaging device of a virtual reality system, such that the virtual reality system can track the location and orientation of the entire HMD 1400. Information generated by the IMU and the position sensors 1412 may be compared with the position and orientation obtained by tracking the locators 1408, for improved tracking of position and orientation of the HMD. Accurate position and orientation is important for presenting appropriate virtual scenery to the user as the latter moves and turns in 3D space.

The HMD 1400 may further include an eye tracking system 1414, which determines orientation and position of user's eyes in real time. The obtained position and orientation of the eyes allows the HMD 1400 to determine the gaze direction of the user and to adjust the image generated by the display module 1200A accordingly. In one embodiment, the vergence, that is, the convergence angle of the user's eyes gaze, is determined. The focusing power of the lens system 1212 may be adjusted depending on the vergence to reduce or lessen the vergence-accommodation conflict. The active PBP LC devices described herein may be included in the lens system 1212 to adjust the focusing power. In one embodiment, the main collimating and redirecting function is performed by a dedicated, non-adjustable lens, and the active PBP LC lens stacks, e.g. the optical stack 1000 of FIG. 10 and/or the optical stack 1100 of FIG. 11, are used for fine focus adjustment.

Figure 15A:
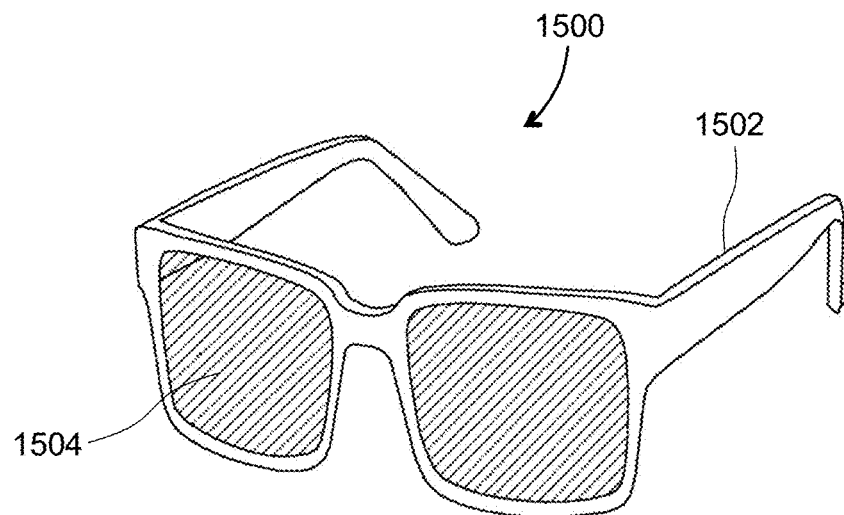
FIG. 15A is an isometric view of an eyeglasses form factor near-eye AR/VR display incorporating an active LC PBP device of the present disclosure.
Figure 15B:
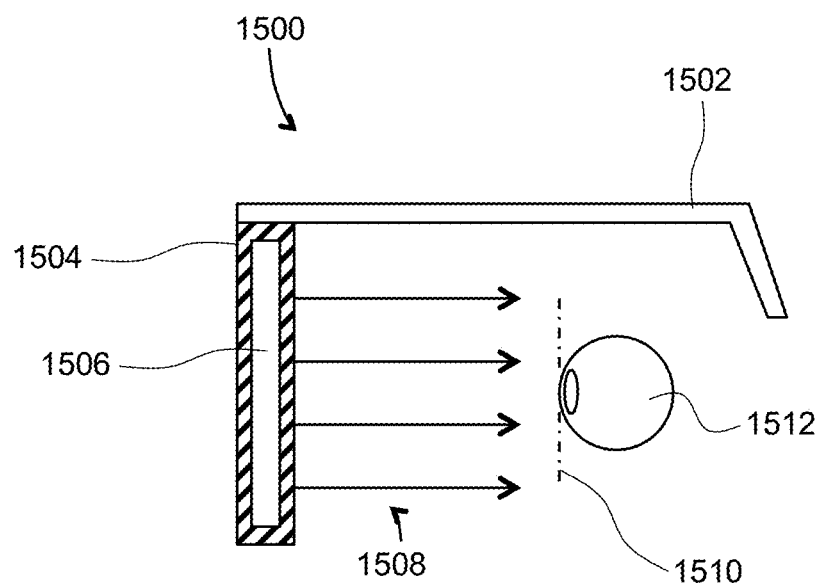
FIG. 15B is a side cross-sectional view of the display of FIG. 15A.

Referring to FIGS. 15A and 15B, a near-eye AR/VR display 1500 is a more lightweight and compact type of an HMD. The near-eye AR/VR display 1500 has a frame 1502 in form of a pair of eyeglasses, and a display 1504 including a display assembly 1506 including, without limitation, the near-eye VR display module 1200A or the near-eye AR display module 1200B. The display assembly 1506 provides image light 1508 to an eyebox 1510, defined as a geometrical area where a good-quality image may be presented to a user's eye 1512. The display assembly 1506 may include a separate VR/AR display module for each eye, or one display module for both eyes. By way of a non-limiting example, an active PBP LC grating may be coupled to a single electronic display for directing images to the left and right eyes of the user in a time-sequential manner, one frame for left eye and one frame for right eye. The electronic display may include, without limitation, a liquid crystal display (LCD), an organic light emitting display (OLED), an inorganic light emitting display (ILED), an active-matrix organic light-emitting diode (AMOLED) display, a transparent organic light emitting diode (TOLED) display, a projector, or a combination thereof. More generally, such a display may be provided for any of the display modules or systems disclosed herein. The near-eye AR/VR display 1500 may also include an eye-tracking system, not shown.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An active liquid crystal (LC) Pancharatnam-Berry phase (PBP) device comprising:
   a first active LC PBP component comprising a first LC layer having a first retardation substantially equal to: an odd number of half wavelengths of a first color channel; and an even number of half wavelengths of a second color channel; and
   a second active LC PBP component comprising a second LC layer having a second retardation substantially equal to: an odd number of half wavelengths of the second color channel; and an even number of half wavelengths of the first color channel.

2. The active LC PBP device of claim 1, further comprising:
   a third active LC PBP component comprising a third LC layer having a third retardation substantially equal to: an odd number of half wavelengths of a third color channel; an even number of half wavelengths of the first color channel; and an even number of half wavelength of the second color channel;
   wherein the first retardation of the first LC layer is substantially equal to an even number of half wavelengths of the third color channel, and wherein the second retardation of the second LC layer is substantially equal to an even number of half wavelengths of the third color channel; and wherein the first, the second, and the third color channels correspond to red, green, and blue color channels respectively.

3. The active LC PBP device of claim 1, further comprising a first birefringent compensation layer for lessening off-axis variation of the first retardation.

4. The active LC PBP device of claim 3, wherein the first birefringent compensation layer comprises a c-plate having an extraordinary optical axis perpendicular to the c-plate.

5. The active LC PBP device of claim 3, wherein the first active LC PBP component, the second active LC PBP component, and the first birefringent compensation layer form an optical stack.

6. The active LC PBP device of claim 3, further comprising a second birefringent compensation layer for lessening off-axis variation of the second retardation of the second active LC PBP component, wherein the first birefringent compensation layer, the first active LC PBP component, the second birefringent compensation layer, and the second active LC PBP component form an optical stack.

7. The active LC PBP device of claim 1, wherein the first and second active LC PBP components each comprise an active LC PBP lens for a near-eye application.

8. The active LC PBP device of claim 7, further comprising:
a first active compensating LC PBP component having a first compensating LC layer having LC molecules oriented in-plane and perpendicular to in-plane LC molecules in corresponding portions of the first LC layer, to compensate for birefringence of the first LC layer across a clear aperture thereof; and
a second active compensating LC PBP component having a second compensating LC layer having LC molecules oriented in-plane and perpendicular to in-plane LC molecules in corresponding portions of the second LC layer, to compensate for birefringence of the second LC layer across a clear aperture thereof.

9. The active LC PBP device of claim 8, further comprising an LC PBP grating disposed between the active LC PBP components and the active compensating LC PBP components.

10. The active LC PBP device of claim 1, wherein the first and second active LC PBP components each comprise an active LC PBP grating for a near-eye application.

11. The active LC PBP device of claim 2, further comprising:
a switchable polarization rotator disposed downstream of the first, second, and third active LC PBP components; and
a circular polarizer disposed downstream of the switchable polarization rotator.

12. The active LC PBP device of claim 11, wherein the first, second, and third active LC PBP components each comprise an active LC PBP lens for a near-eye application.

13. The active LC PBP device of claim 11, wherein the first, second, and third active LC PBP components each comprise an active LC PBP grating for a near-eye application.

14. The active LC PBP device of claim 2, further comprising:
a first switchable polarization rotator disposed downstream of the first, second, and third active LC PBP components;
fourth, fifth, and sixth active LC PBP components disposed downstream of the first switchable polarization rotator, each one of the fourth, fifth, and sixth active LC PBP components comprising an LC layer having a retardation substantially equal to an odd number of half wavelengths at a respective one of the color channels, while having a retardation substantially equal to even numbers of half wavelengths at remaining two of the color channels;
a second switchable polarization rotator disposed downstream of the fourth, fifth, and sixth active LC PBP components; and
a circular polarizer disposed downstream of the second switchable polarization rotator.

15. The active LC PBP device of claim 13, wherein each active LC PBP component comprises an active LC PBP lens for a near-eye application.

16. The active LC PBP device of claim 13, wherein each active LC PBP component comprises an active LC PBP grating for a near-eye application.

17. A head mounted display comprising an active LC PBP device of claim 1.

18. A method of redirecting or refocusing a light beam comprising first and second color channels, the method comprising:
propagating the light beam through a first LC layer of a first active LC PBP component, the first LC layer having a first retardation substantially equal to: an odd number of half wavelengths of the first color channel; and an even number of half wavelengths of the second color channel; and
propagating the light beam through a second LC layer of a second active LC PBP component, the second LC layer having a second retardation substantially equal to: an odd number of half wavelengths of the second color channel; and an even number of half wavelengths of the first color channel.

19. The method of claim 18, further comprising propagating the light beam through at least one c-plate having an extraordinary optical axis perpendicular to the c-plate.

20. The method of claim 18, further comprising energizing the first and second active LC PBP components to redirect or refocus the light beam.

* * * * *